Figure 1:
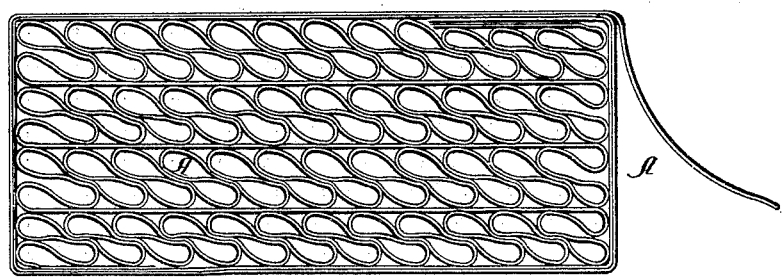

(No Model.)

J. B. McDONALD.
ELECTRODE FOR SECONDARY BATTERIES.

No. 460,235. Patented Sept. 29, 1891.

UNITED STATES PATENT OFFICE.

JOHN B. McDONALD, OF CHICAGO, ILLINOIS.

ELECTRODE FOR SECONDARY BATTERIES.

SPECIFICATION forming part of Letters Patent No. 460,235, dated September 29, 1891.

Application filed February 5, 1891. Serial No. 380,290. (No model.)

*To all whom it may concern:*

Be it known that I, JOHN B. McDONALD, a citizen of the United States of America, residing at Chicago, in the county of Cook and State of Illinois, have invented certain new and useful Improvements in Storage-Batteries, of which the following is a specification.

My invention relates to certain improvements in the structure of storage-batteries, the purpose of which is to make them longer-lived, said invention being particularly applied to the grids or plates which support the active material of the battery. These improvements are illustrated in the drawings herewith presented, in which—

Figure 2:
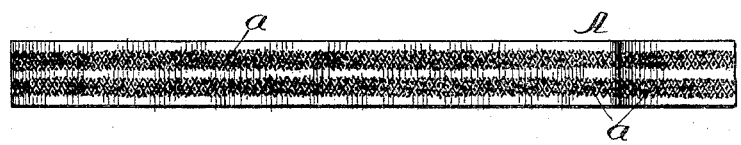

Figure 1 is a flat side view of a grid having my improvements applied thereto, and Fig. 2 is an edge view of the same.

One of the most successful of the storage-batteries in use at present is that in which the grids or plates for the support of the active material are constructed by bending a lead ribbon or tape back and forth upon itself, in the form shown clearly in Fig. 1, until it forms an open frame-work of considerable size, the depth of which is equal to the width of the lead tape. This form of grid has been found fairly satisfactory, but in use it has proven defective in that the smooth sides of the metal tape do not furnish a sufficiently secure hold for the active material, so that the latter, because of the changes it undergoes in charging and discharging, gradually loosens itself from the grid and falls out. It is my purpose to remedy this defect, and I have done so by forming a series of indentations in the lead tape before putting it into the grid, so that when the latter is completed these indentations receive the active material and effectually prevent it from slipping out of the holes of the grid.

Referring to the drawings, the lead tape is lettered A and the indentations $a$. The latter are clearly seen in Fig. 2 along the edge of the grid, although they are of advantage only in the inner portions thereof. The whole ribbon, however, is prepared by passing it through suitable machinery before it is put into the form of a grid.

It is obvious that the size, shape, and character of the indentations are entirely immaterial. They may consist of holes extending entirely through the ribbon, although such a construction would be much weaker than the one shown. Furthermore, raised portions might be substituted for the indentations with possibly as good results. I do not consider any of these modifications a departure from my invention.

I claim as new and desire to secure by Letters Patent—

In a storage-battery, a grid for the support of the active material, composed of a metal ribbon having indentations or raised portions upon its surface and bent back and forth upon itself to form the supporting-frame, substantially as described.

JOHN B. McDONALD.

Witnesses:
GEO. T. BURROUGHS,
E. TILLOTSON.